(12) United States Patent
Schwarzbich et al.

(10) Patent No.: US 7,290,800 B2
(45) Date of Patent: Nov. 6, 2007

(54) TELESCOPING STEERING SHAFT

(75) Inventors: Jörg Schwarzbich, Bielefeld (DE); Burkhard Harhoff, Bielefeld (DE)

(73) Assignee: DURA Automotive Systems Reich GmbH, Lage (DE)

( * ) Notice: Subject to any disclaimer, the term of this patent is extended or adjusted under 35 U.S.C. 154(b) by 0 days.

(21) Appl. No.: 11/430,773

(22) Filed: May 9, 2006

(65) Prior Publication Data

US 2006/0202463 A1 Sep. 14, 2006

(51) Int. Cl.
 *B62D 1/18* (2006.01)
(52) U.S. Cl. .......................... 280/775; 74/493
(58) Field of Classification Search ................ 280/775, 280/779; 74/493, 495; 464/167, 168, 172
See application file for complete search history.

(56) References Cited

U.S. PATENT DOCUMENTS

| 1,795,567 | A | * | 3/1931 | Maurice | 74/493 |
| 4,739,673 | A | * | 4/1988 | Ishikawa et al. | 74/493 |
| 4,962,944 | A | * | 10/1990 | Reiche et al. | 280/775 |
| 5,029,489 | A | * | 7/1991 | Burmeister et al. | 74/493 |
| 5,737,971 | A | | 4/1998 | Riefe et al. | |
| 6,152,489 | A | * | 11/2000 | Hedderly et al. | 280/779 |
| 6,220,630 | B1 | * | 4/2001 | Sundholm et al. | 280/777 |
| 6,234,040 | B1 | * | 5/2001 | Weber et al. | 74/493 |
| 6,260,433 | B1 | * | 7/2001 | Aurora | 74/493 |
| 6,364,778 | B1 | * | 4/2002 | Beitzel et al. | 464/168 |
| 6,540,429 | B2 | * | 4/2003 | Weisgerber et al. | 403/321 |
| 6,729,007 | B2 | * | 5/2004 | Weisberger et al. | 29/434 |
| 2003/0006600 | A1 | * | 1/2003 | Schwarzbich | 280/775 |

FOREIGN PATENT DOCUMENTS

WO WO 98/10960 3/1998

* cited by examiner

*Primary Examiner*—Eric Culbreth
*Assistant Examiner*—Barry Gooden, Jr.
(74) *Attorney, Agent, or Firm*—Gauthier & Connors LLP

(57) ABSTRACT

A telescoping steering shaft, especially an intermediate steering shaft, with an inner rod (1) and an outer tube (2), placed thereon in twist-proof fashion and able to slide lengthwise by means of a roller bearing unit (3), while the roller bearing unit (3), which can move axially relative to the inner rod (1) and outer tube (2), has a plurality of rolling elements (5) held in a retainer (4), and is configured such that at least one driver (6) is mounted in the roller bearing retainer (4), engaging by form fit with the wall of the inner rod (1) and the outer tube (2).

5 Claims, 2 Drawing Sheets

TELESCOPING STEERING SHAFT

PRIORITY INFORMATION

This application claims the benefit of International Patent Application Serial No. PCT/EP2004/011448 filed on Oct. 13, 2004 and claims priority to German Application Serial No. 203 17 344.9, filed on Nov. 11, 2003.

BACKGROUND OF THE INVENTION

The present invention relates to a telescopic steering shaft, especially an intermediate steering shaft, with an inner rod and an outer tube, placed thereon in twist-proof fashion and able to slide lengthwise by means of a roller bearing unit, while the roller bearing unit which can move axially relative to the inner rod and outer tube has a plurality of rolling elements held in a retainer.

Such a steering shaft is known, for example, from DE 38 13 422 A1. The inner rod and the outer tube of this steering shaft have a cross section attuned to each other, preferably a polygonal one, such that the two parts cannot twist relative to each other.

Thanks to a roller bearing unit arranged between the outer tube and the inner rod, these parts can shift relative to each other in the lengthwise axial direction. The roller bearing unit has cylindrically shaped roller elements, which extend transversely to the direction of shifting and are mounted so that they can roll off each other in a retainer. Thereby, the roller elements are supported against the mutually facing surfaces of the inner rod and the outer tube.

In ordinary use, steering shafts are subject to torsional strain, and the torsional forces are transmitted by the roller bearing unit.

Full functionality of the steering shaft requires that the roller bearing unit be positioned in a permanently uniform manner. Because of frictional forces during the relative lengthwise shifting of the outer tube on the inner rod, an uncontrolled progressing motion of the roller bearing unit may occur, whereby its driving route differs slightly whether the outer tube is pushed forward slightly different or backward. In long-term use, the addition of the individually occurring driving route distance differences results in a wandering of the roller bearing unit to such an extent that the functionality of the steering shaft is no longer assured.

Precisely because the steering shaft is one of the safety-relevant parts of an automobile, this situation is of special importance. A satisfactory solution for the problem has not yet been found, so that the basic goal of the invention is to modify a steering shaft of the above described kind so that uncontrolled movement of the roller bearing unit is prevented and thus the functionality of the steering shaft is enhanced.

A telescoping steering shaft, an intermediate steering shaft, with an inner rod and an outer tube positioned in a twist-proof fashion. The telescoping steering shaft is able to slide lengthwise by means of a roller bearing unit. The roller bearing unit can move axially relative to the inner rod and the outer tube has a plurality of rolling elements held in a retainer. At least one driver is mounted in the roller bearing retainer, engaging by form fit with an outer surface of the inner rod and an inner surface of the outer tube, the driver has a gear wheel, whose teeth engage with a serration of the inner rod and a serration of the outer tube.

This structural configuration of the steering shaft now produces a restricted guidance of the roller bearing unit, i.e., an uncontrolled axial movement and thus the described "wandering" of the roller bearing unit is virtually impossible. This holds for both an intentional telescoping of the steering shaft and for the loads acting on the roller bearing unit as a result of the shaking and vibration during operation, which would otherwise result in a corresponding lengthwise movement.

According to one advantageous embodiment of the invention, the driver is formed in the shape of a gear wheel, which is pivotally mounted in a recess of the roller bearing retainer and engages with a serration formed on the inner rod as a kind of toothed rack and with a similar serration on the outer tube, while the serration of the inner rod is provided on the outer surface and that of the outer tube is provided on the inner surface.

As mentioned, the form-fitting engagement of the driver with the inner rod and the outer tube accomplishes, on the one hand, a forced relative movement of the roller bearing unit to the inner rod and the outer rod, and, on the other hand, the axial relative movement of the inner rod to the outer tube occurs very smoothly thanks to the rolling of the driver in the form of a gear wheel, such that there is virtually no difference in terms of function or operating comfort as compared to a telescopic steering shaft not comprising such a driver.

According to another idea of the invention, the gear wheel is made of plastic as an injection molded part, comprising the necessary abrasion resistance but requiring no special design measures for its mounting in the roller bearing retainer, which moreover likewise consists advisedly of plastic.

A loose mounting of the gear wheel in the roller bearing retainer also enables easy assembly of the entire steering shaft, since the individual parts, i.e., the inner rod with the roller bearing unit pushed onto it and accommodating the gear wheel, and the outer tube guided along it, are very easily put together.

The making of the serrations on the inner rod and the outer tube also could not be easier, since the only step to do is emboss grooves running transverse to the lengthwise axis, and the teeth of the gear wheel will engage with them as it rolls along.

In principle, a relatively simple stamping is enough to produce the grooves forming the serration. The important point is to have a uniform spacing between the gaps matching up with the teeth of the gear wheel.

Other advantageous embodiments of the invention are shown in the subsidiary claims.

BRIEF DESCRIPTION OF THE DRAWINGS

An exemplary embodiment of the invention will now be described with reference to the attached figures.

These show.

DESCRIPTION OF THE INVENTION

Figure 1:
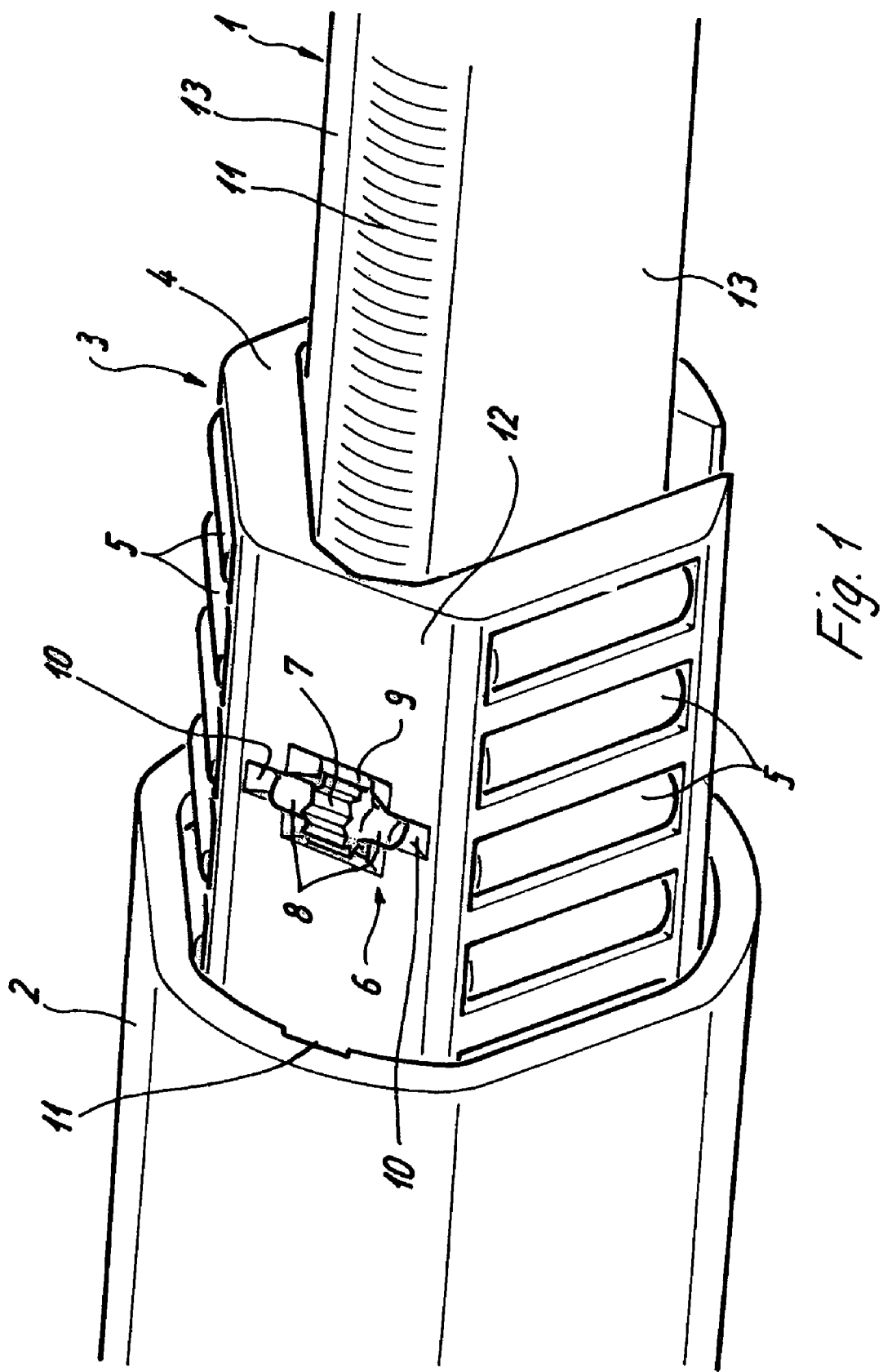
FIG. 1, a partial cut-out perspective view of a telescopic steering shaft.
Figure 2:
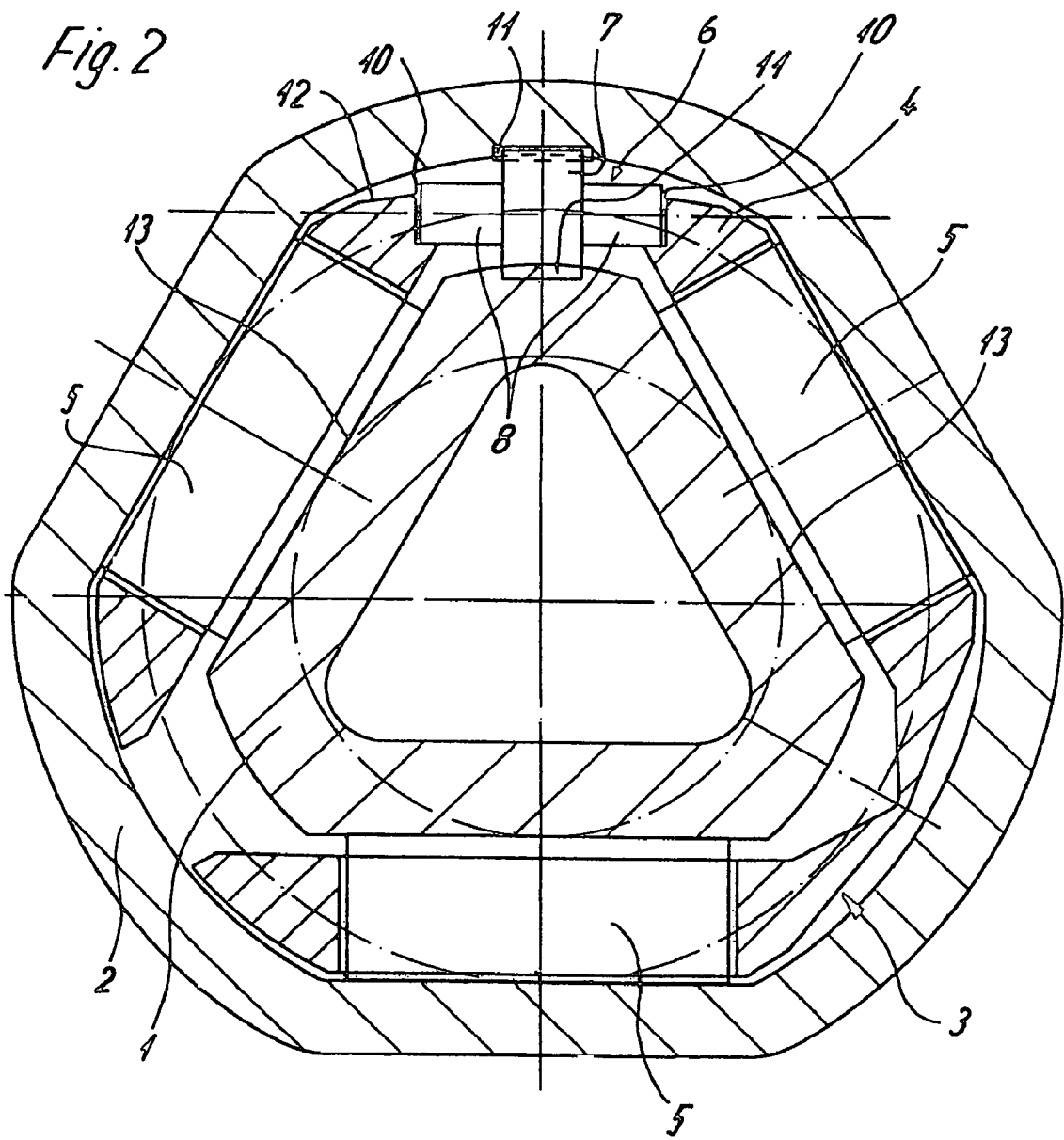
FIG. 2, a cross section al view through the steering shaft.
Figure 3:
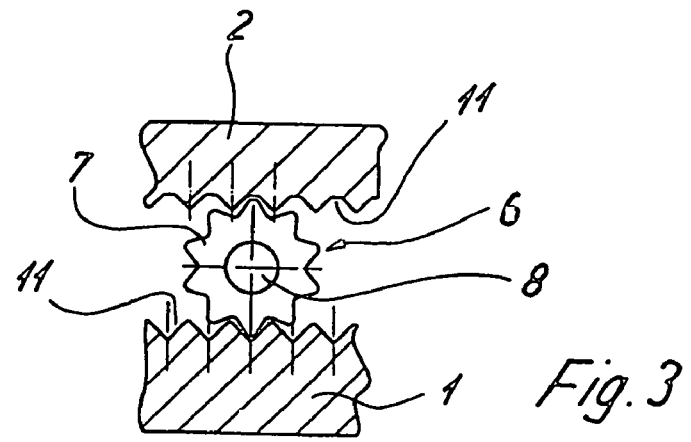
FIG. 3, a detail of the steering shaft in longitudinal section.

FIG. 1 shows a telescopic steering shaft, especially an intermediate steering shaft, with a tubular inner rod 1 and an outer tube 2 placed thereon in twist-proof fashion and able to slide axially by means of a roller bearing unit 3. The inner rod 1, the outer tube 2, and the roller bearing unit 3 comprising a retainer 4 as well as roller elements 5 in the form of bearing rollers mounted therein with their axis of rotation arranged transverse to the direction of shifting of the inner rod 1 and outer tube 2, are formed in approximately a triangular shape in cross section.

Between two sides of the retainer 4, each accommodating the cylindrical roller elements 5, a driver 6 is provided in an intermediate surface 12, being in the form of a gear wheel 7 with journals 8 connected at both ends.

By these journals 8, the driver 6 is mounted in journal pockets 10 of the intermediate surface 12, adjacent to the opposite sides of a recess 9 in which the gear wheel 7 fully extends, i.e., the recess 9 forms a window in this region.

The diameter of the gear wheel 7 is larger than the thickness of the roller bearing retainer 4 in this region, so that the teeth of the gear wheel 7 project above and below beyond the intermediate surface 12.

In order to produce a form fit between the roller bearing unit 3, the inner rod 1, and the outer tube 2, the inner rod 1 has a serration 11 on its side facing the intermediate surface 12, adjoined by a running surface 13 on either side. The serration is formed by grooves at equal spacing from each other, running transverse to the lengthwise axis of the inner rod 1 and engaging with the teeth of the gear wheel 7.

The outer tube 2 is also provided with a serration 11 in this sense, provided on the inner side of the outer tube 2 and engaging with the teeth of the gear wheel 7.

Thanks to the form fit produced in this way, the roller bearing unit 3 moves exactly proportionally to the lengthwise shifting of the inner rod 1 and the outer tube 2 during a relative back and forth movement of the inner rod 1 to the outer tube 2. A wandering, as described in the prior art, is prevented.

The invention claimed is:

1. Telescoping steering shaft, an intermediate steering shaft, with an inner rod and an outer tube, placed thereon in twist-proof fashion and able to slide lengthwise by means of a roller bearing unit, while the roller bearing unit which can move axially relative to the inner rod and outer tube has a plurality of rolling elements held in a retainer, wherein at least one driver is mounted in the roller bearing retainer, engaging by form fit with an outer surface of the inner rod and an inner surface of the outer tube, and wherein the driver has a gear wheel, whose teeth engage with a serration of the inner rod and a serration of the outer tube.

2. Steering shaft according to claim 1, wherein the driver is mounted in the roller bearing retainer so that it can turn by means of journals connected to the gear wheel.

3. Steering shaft according to claim 2, wherein journal pockets are provided in the bearing retainer to accommodate the journals.

4. Steering shaft according to claim 2, wherein a recess in the form of a window is provided in the roller bearing retainer, from which the gear wheel protrudes at both sides.

5. Steering shaft according to claim 1, wherein the serrations of the inner rod and the outer tube are formed from grooves, which run transverse to the lengthwise axis of the inner rod and outer tube and are arranged spaced apart from each other corresponding to a tooth division of the gear wheel.

\* \* \* \* \*